United States Patent
Benedict et al.

(10) Patent No.: US 10,299,655 B2
(45) Date of Patent: May 28, 2019

(54) CALORIC HEAT PUMP DISHWASHER APPLIANCE

(71) Applicant: General Electric Company, Schenectady, NY (US)

(72) Inventors: Michael Alexander Benedict, Louisville, KY (US); David G. Beers, Elizabeth, IN (US)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 15/155,105

(22) Filed: May 16, 2016

(65) Prior Publication Data

US 2017/0328609 A1 Nov. 16, 2017

(51) Int. Cl.
*A47L 15/42* (2006.01)
*F25B 21/00* (2006.01)
*A47L 15/48* (2006.01)

(52) U.S. Cl.
CPC ....... *A47L 15/4287* (2013.01); *A47L 15/4285* (2013.01); *A47L 15/4246* (2013.01); *A47L 15/48* (2013.01); *F25B 21/00* (2013.01); *F25B 2321/002* (2013.01); *Y02B 30/66* (2013.01)

(58) Field of Classification Search
CPC ............. A47L 15/4285; A47L 15/4287; F25B 2321/002
See application file for complete search history.

(56) References Cited

U.S. PATENT DOCUMENTS

| | | |
|---|---|---|
| 668,560 A | 2/1901 | Fulner et al. |
| 2,671,929 A | 3/1954 | Gayler |
| 2,765,633 A | 10/1956 | Muffly |
| 3,816,029 A | 6/1974 | Bowen et al. |
| 4,037,427 A | 7/1977 | Kramer |
| 4,107,935 A | 8/1978 | Steyert, Jr. |
| 4,200,680 A | 4/1980 | Sasazawa et al. |
| 4,259,843 A | 4/1981 | Kausch |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |

(Continued)

FOREIGN PATENT DOCUMENTS

| | | |
|---|---|---|
| CA | 2893874 A1 | 6/2014 |
| CA | 2919117 A1 | 1/2015 |

(Continued)

OTHER PUBLICATIONS

Machine translation of EP-2215955-A1, dated Aug. 2010. (Year: 2010).*

(Continued)

*Primary Examiner* — Michael E Barr
*Assistant Examiner* — Kevin G Lee
(74) *Attorney, Agent, or Firm* — Dority & Manning, P.A.

(57) ABSTRACT

A dishwasher appliance includes a caloric heat pump system that is configured for heating and cooling a wash chamber of a tub. A field generator is positioned such that caloric material stages are moved in and out of a field of the field generator during operation of the caloric heat pump system. A pump circulates a heat transfer fluid between a first heat exchanger, a second heat exchanger and the caloric material stages.

18 Claims, 9 Drawing Sheets

(56) References Cited

U.S. PATENT DOCUMENTS

| | | | |
|---|---|---|---|
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,785,636 A | 11/1988 | Hakuraku et al. |
| 4,796,430 A | 1/1989 | Malaker et al. |
| 5,091,361 A | 2/1992 | Hed |
| 5,156,003 A | 10/1992 | Yoshiro et al. |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,526,759 B2 | 3/2003 | Zimm et al. |
| 6,588,215 B1 | 7/2003 | Ghoshal |
| 6,668,560 B2 | 12/2003 | Zimm et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 2002/0040583 A1 | 4/2002 | Barclay et al. |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187803 A1 | 9/2004 | Regev |
| 2004/0250550 A1 | 12/2004 | Bruck |
| 2005/0109490 A1 | 5/2005 | Harmon et al. |
| 2005/0274676 A1 | 12/2005 | Kumar et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0062821 A1 | 3/2011 | Chang et al. |
| 2011/0082026 A1 | 4/2011 | Sakatani et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0079834 A1 | 4/2012 | Dinesen |
| 2012/0222427 A1 | 9/2012 | Hassen |
| 2012/0222428 A1 | 9/2012 | Celik et al. |
| 2012/0267090 A1 | 10/2012 | Kruglick |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019610 A1 | 1/2013 | Zimm et al. |
| 2013/0104568 A1 | 5/2013 | Kuo et al. |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0165594 A1* | 6/2014 | Benedict ................ F25B 21/00 62/3.1 |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0325996 A1 | 11/2014 | Muller |

(56) References Cited

U.S. PATENT DOCUMENTS

| | | |
|---|---|---|
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362225 A1 | 12/2015 | Schwartz |
| 2016/0000999 A1 | 1/2016 | Focht et al. |
| 2016/0084544 A1 | 3/2016 | Radermacher et al. |
| 2016/0091227 A1 | 3/2016 | Leonard et al. |
| 2016/0355898 A1 | 12/2016 | Vieyra Villegas et al. |
| 2016/0356529 A1 | 12/2016 | Humburg |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |

FOREIGN PATENT DOCUMENTS

| | | | |
|---|---|---|---|
| CN | 101979937 A | 2/2011 | |
| CN | 201772566 U | 3/2011 | |
| CN | 101788207 B | 9/2011 | |
| CN | 202432596 U | 9/2012 | |
| CN | 103090583 A | 5/2013 | |
| CN | 103712401 A | 4/2014 | |
| CN | 102077303 B | 4/2015 | |
| DE | 102013223959 A1 | 5/2015 | |
| DE | 202015106851 U1 * | 1/2016 | ............ F24C 15/00 |
| EP | 2071255 A1 | 6/2009 | |
| EP | 2108904 A1 | 10/2009 | |
| EP | 2935468 A1 | 3/2010 | |
| EP | 2215955 A1 * | 8/2010 | ......... A47L 15/4225 |
| EP | 2322072 A2 * | 5/2011 | ......... A47L 15/4291 |
| JP | 59232922 | 12/1984 | |
| JP | 3205196 B2 | 9/2001 | |
| JP | 2002315243 A | 10/2002 | |
| JP | 2007147136 A | 6/2007 | |
| JP | 2007291437 A | 11/2007 | |
| JP | 2008051412 A | 3/2008 | |
| JP | 2010112606 A | 5/2010 | |
| JP | 6212955 B2 | 12/2014 | |
| JP | 2017207222 A | 11/2017 | |
| KR | 101100301 B1 | 12/2011 | |
| KR | 1238234 B1 | 3/2013 | |
| WO | WO 0212800 A1 | 2/2002 | |
| WO | WO 03016794 A1 | 2/2003 | |
| WO | WO 2004/068512 | 8/2004 | |
| WO | WO 2007/036729 A1 | 4/2007 | |
| WO | WO 2009/024412 | 2/2009 | |
| WO | WO 201103594 A1 | 3/2011 | |
| WO | WO 2014099199 A1 | 6/2014 | |
| WO | WO 2014170447 A1 | 10/2014 | |
| WO | WO 2014173787 A1 | 10/2014 | |
| WO | WO 2015017230 A1 | 2/2015 | |
| WO | WO 2017042266 A1 | 3/2017 | |

OTHER PUBLICATIONS

International Search Report issued in connection with PCT Application No. PCT/US2014/042485 dated Oct. 23, 2014.
International Search Report issued in connection with PCT Application No. PCT/US2014/017431 dated May 9, 2014.
International search report issued in connection with PCT/US2013/070518, dated Jan. 22, 2014.
Tetsuji Okamura, Performance of a room-temperature rotary magnet refrigerator, dated Nov. 28, 2005, Elsevier.
Journal of Alloys and Compounds, copyright 2008 Elsevier B..V.
Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.
Effects of annealing on the magnetic entropy change and exchange bias behavior in melt-spun Ni—Mn—In ribbons, X.Z. Zhao, C.C. Hsieh, et al Science Direct, Scripta Materialia 63 (2010).
PCT International Search Report and Written Opinion issued in connection with PCT Application No. PCT/US2013/070023 dated Feb. 27, 2014.
Barbara Pulko, Epoxy-bonded La—Fe—Co—Si magnetocaloric plates, Journal of Magnetism and Magnetic Materials, 375 (2015) 65-73.
International Search Report of PCT/US2014/047925 dated Nov. 10, 2014.
Andrej Kitanovski, Present and future caloric refrigeration and heat-pump technologies, International Journal of Refrigeration, vol. 57, Sep. 2015, pp. 288-298.

* cited by examiner

CALORIC HEAT PUMP DISHWASHER APPLIANCE

FIELD OF THE INVENTION

The present subject matter relates generally to dishwasher appliances.

BACKGROUND OF THE INVENTION

Heat pumps are gaining broader acceptance as a more economic and ecologically-friendly alternative to electric heaters. Conventional sealed system technology typically utilizes a heat pump that relies on compression and expansion of a fluid refrigerant to receive and reject heat in a cyclic manner so as to effect a desired temperature change or i.e. transfer heat energy from one location to another. This cycle can be used to provide e.g., for the receiving of heat from the environment and the rejecting of such heat elsewhere. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Accordingly, a dishwasher appliance with features for efficiently heating and/or cooling a wash chamber of the dishwasher appliance would be useful. In particular, a dishwasher appliance with features for efficiently heating and/or cooling a wash chamber of the dishwasher appliance without requiring compression of fluid refrigerant would be useful.

BRIEF DESCRIPTION OF THE INVENTION

The present subject matter provides a dishwasher appliance. The dishwasher appliance includes a caloric heat pump system that is configured for heating and cooling a wash chamber of a tub. A field generator is positioned such that caloric material stages are moved in and out of a field of the field generator during operation of the caloric heat pump system. A pump circulates a heat transfer fluid between a first heat exchanger, a second heat exchanger and the caloric material stages. Additional aspects and advantages of the invention will be set forth in part in the following description, or may be apparent from the description, or may be learned through practice of the invention.

In a first exemplary embodiment, a dishwasher appliance is provided. The dishwasher appliance includes a tub that defines a wash chamber. A first heat exchanger is coupled to the tub for delivery of heat to and from the wash chamber of the tub. The dishwasher appliance also includes a second heat exchanger. A caloric heat pump system is configured for heating and cooling the wash chamber of the tub at the first heat exchanger. The caloric heat pump system includes a plurality of caloric material stages. A field generator is positioned proximate the caloric material stages. The field generator is positioned such that the caloric material stages are moved in and out of a field of the field generator during operation of the caloric heat pump system. The dishwasher appliance also includes a pump for circulating a heat transfer fluid between the first and second heat exchangers and the caloric material stages.

In a second exemplary embodiment, a dishwasher appliance is provided. The dishwasher appliance includes a tub that defines a wash chamber. A first heat exchanger is coupled to the tub for delivery of heat to and from the wash chamber of the tub. A second heat exchanger is disposed within a machinery compartment below the tub such that the second heat exchanger is spaced apart from the first heat exchanger. A caloric heat pump system is configured for heating and cooling the wash chamber of the tub via the first heat exchanger. The caloric heat pump system includes a plurality of caloric material stages disposed within the machinery compartment below the tub. A field generator is positioned proximate the caloric material stages. The field generator is positioned such that the caloric material stages are moved in and out of a field of the field generator during operation of the caloric heat pump system. A pump is disposed within the machinery compartment below the tub. The pump is configured for circulating an aqueous heat transfer fluid between the first and second heat exchangers and the caloric material stages.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a dishwasher appliance with a caloric heat pump system for heating or cooling water within the dishwasher appliance. While described in greater detail below in the context of a magneto-caloric heat pump system, one of skill in the art will recognize that other suitable caloric materials may be used in a similar manner to heat or cool water within the dishwasher appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials another other similar caloric materials may be used in place of or in addition to the magneto-caloric material described below to heat or cool water within the dishwasher appliance. Thus, caloric material is used broadly herein to encompass materials that undergo heating or cooling when exposed to a changing field from a field generator, where the field generator may be an electric field generator, an actuator for applying mechanical stress or pressure, etc.

Figure 1:
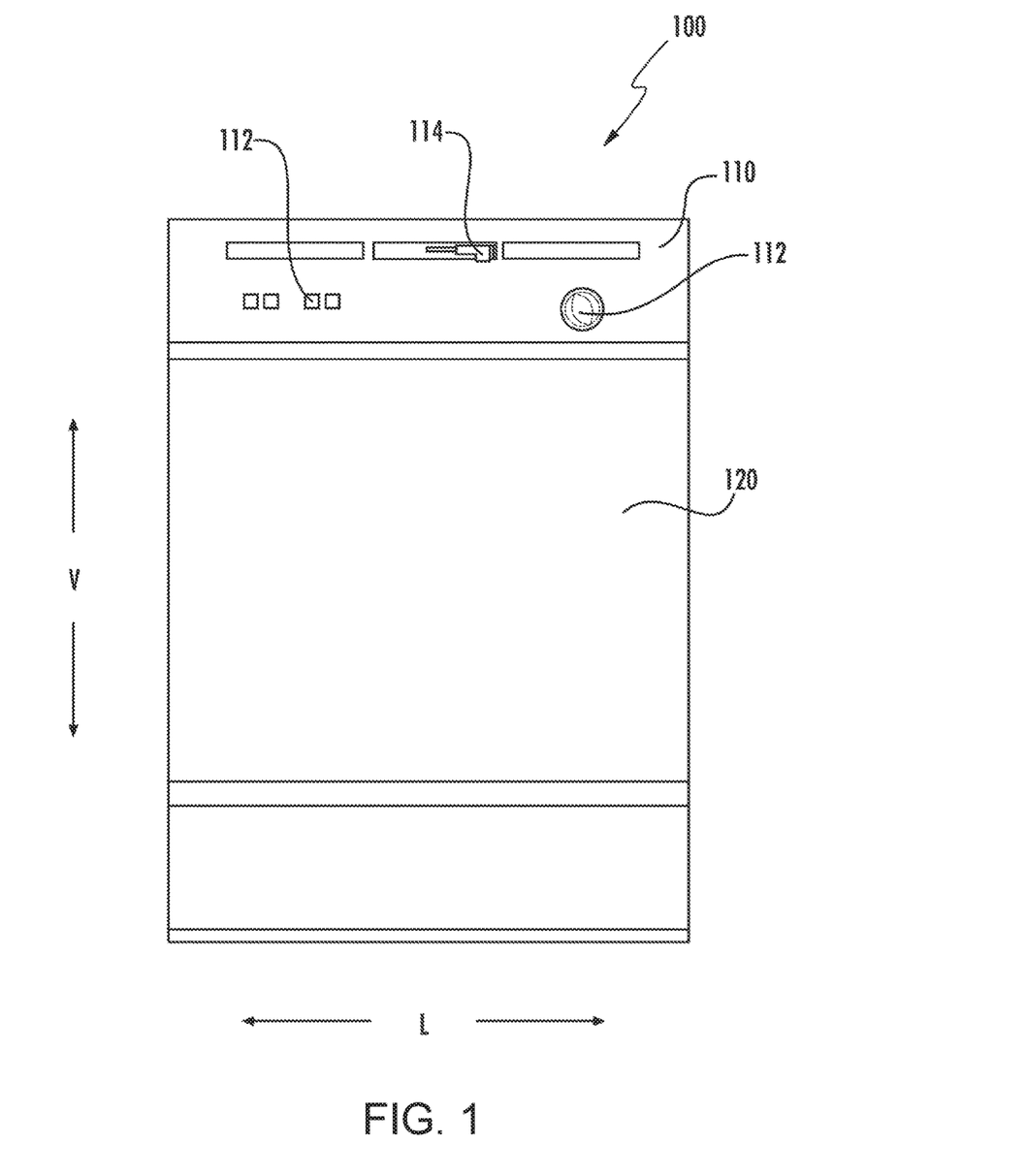
FIG. 1 provides a front elevation view of a dishwasher appliance according to an exemplary embodiment of the present subject matter.
Figure 2:
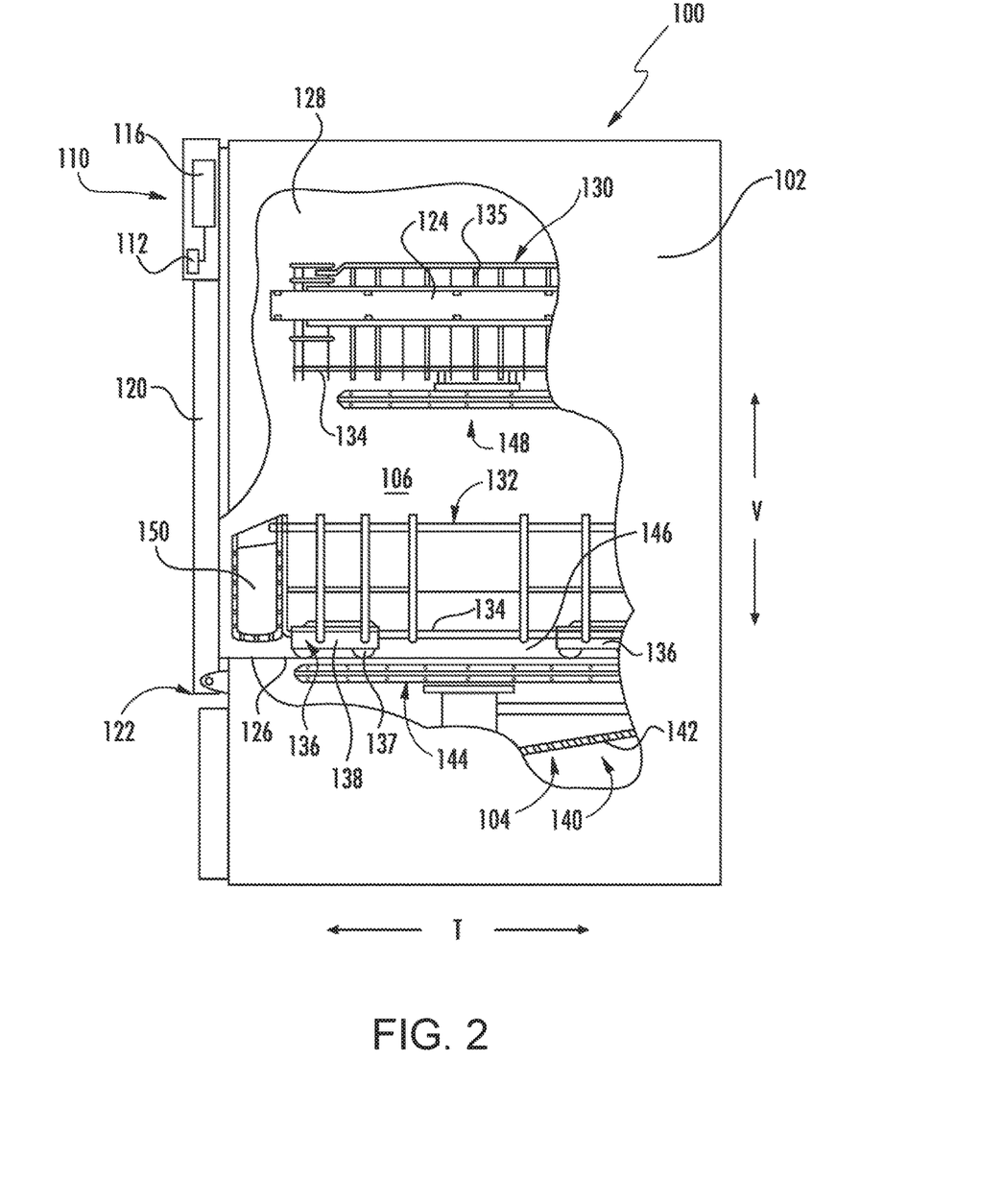
FIG. 2 provides a partial side section view of the exemplary dishwasher appliance of FIG. 1.

FIGS. 1 and 2 depict a dishwasher appliance 100 according to an exemplary embodiment of the present subject matter. Dishwasher appliance 100 defines a vertical direction V, a lateral direction L (FIG. 1) and a transverse direction T (FIG. 2). The vertical, lateral, and transverse directions V, L, and T are mutually perpendicular and form an orthogonal direction system.

Dishwasher appliance 100 includes a chassis or cabinet 102 having a tub 104. Tub 104 defines a wash chamber 106 and includes a front opening (not shown) and a door 120 hinged at its bottom 122 for movement between a normally closed vertical position (shown in FIGS. 1 and 2), wherein wash chamber 106 is sealed shut for washing operation, and a horizontal open position for loading and unloading of articles from dishwasher appliance 100. A latch 114 is used to lock and unlock door 120 for access to chamber 106.

Slide assemblies 124 are mounted on opposing tub sidewalls 128 to support and provide for movement of an upper rack 130. Lower guides 126 are positioned in opposing manner of the sides of chamber 106 and provide a ridge or shelf for roller assemblies 136 so as to support and provide for movement of a lower rack 132. Each of the upper and lower racks 130 and 132 is fabricated into lattice structures including a plurality of elongated members 134 and 135 that extend in lateral L, transverse T, and/or vertical V directions. Each rack 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by slide assemblies 124 and roller assemblies 136 that carry the upper and lower racks 130 and 132, respectively. A silverware basket 150 may be removably attached to the lower rack 132 for placement of silverware, small utensils, and the like, that are too small to be accommodated by the upper and lower rack assemblies 130, 132.

Dishwasher appliance 100 also includes a lower spray assembly 144 that is rotatably mounted within a lower region 146 of the wash chamber 106 and above a tub sump portion 142 so as to rotate in relatively close proximity to lower rack 132. A spray arm or mid-level spray assembly 148 is located in an upper region of the wash chamber 106 and may be located in close proximity to upper rack 130. Additionally, an upper spray assembly (not shown) may be located above the upper rack 130 and mounted to an upper wall of tub 104.

Lower and mid-level spray assemblies 144, 148 and the upper spray assembly are fed by a fluid circulation assembly for circulating water and wash fluid in the tub 104. Portions of the fluid circulation assembly may be located in a machinery compartment 140 located below tub sump portion 142 of tub 104, as generally recognized in the art. Each spray assembly includes an arrangement of discharge ports or orifices for directing washing liquid onto dishes or other articles located in upper and lower rack assemblies 130, 132, respectively. The arrangement of the discharge ports in at least the lower spray assembly 144 provides a rotational force by virtue of washing fluid flowing through the discharge ports. The resultant rotation of lower spray assembly 144 provides coverage of dishes and other articles with a washing spray.

It should be appreciated that the present subject matter is not limited to any particular style, model, or configuration of dishwasher appliance. Thus, the exemplary embodiment depicted in FIGS. 1 and 2 is provided for illustrative purposes only. For example, different locations may be provided for a user interface 112, different configurations may be provided for upper and lower racks 130, 132 and/or lower and mid-level spray assemblies 144, 148, and other differences may be applied as well.

Figure 3:
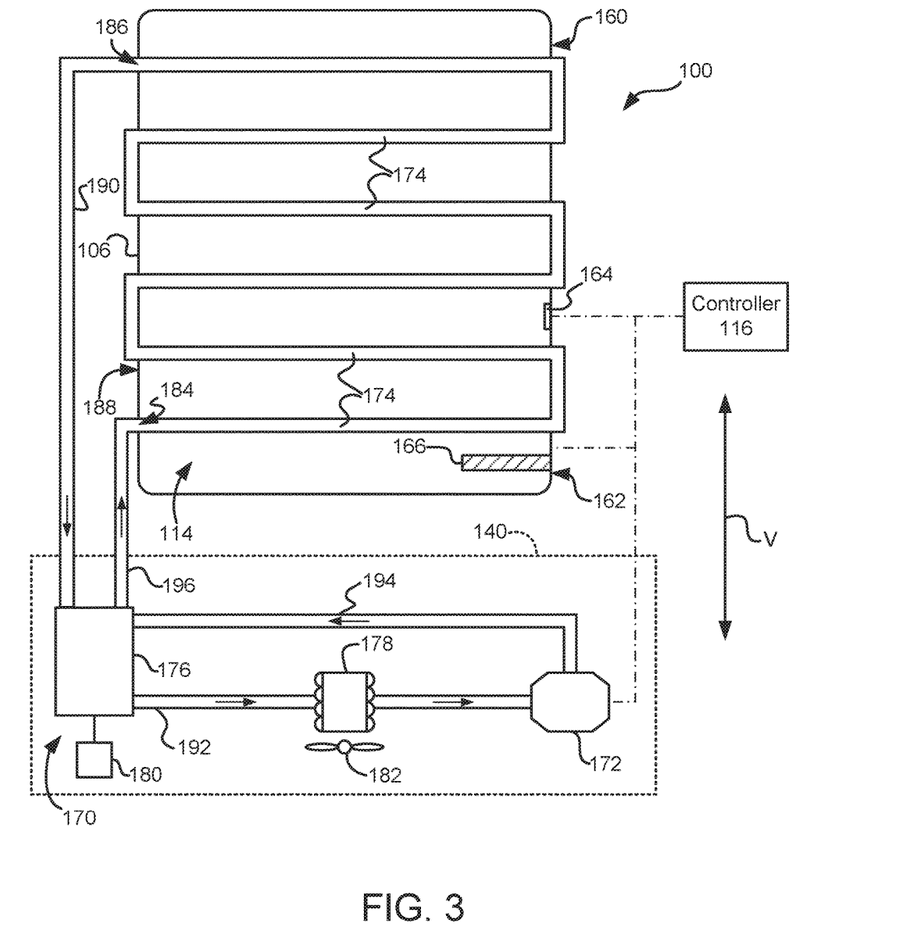
FIG. 3 provides a schematic view of certain components of the exemplary dishwasher appliance of FIG. 1.

FIG. 3 provides a schematic view of certain components of dishwasher appliance 100 including tub 104 and machinery compartment 140. As shown in FIG. 3, dishwasher appliance 100 includes a heating element 166 and a heat pump system 170 for heating and/or cooling wash chamber 106 of tub 104. Heating element 166 can be any suitable heating element, such as an electric resistance element. Heating elements 166 may be mounted to tub at or adjacent tub sump portion 142 of tub 104 within wash chamber 106 of tub 104.

Heat pump system 170 includes a pump 172, a first heat exchanger 174, a heat pump 176 and a second heat exchanger 178. Various components of heat pump system 170 may be positioned within machinery compartment 140 below tub 104, including pump 172, heat pump 176 and second heat exchanger 178, e.g., while first heat exchanger 174 is positioned on or at tub 104 above machinery compartment 140.

First heat exchanger 174 is assembled in a heat exchange relationship with tub 104 in order to heat and/or cool wash chamber 106 of tub 104 during operation of heat pump system 170. Thus, first heat exchanger 174 may be positioned at or adjacent wash chamber 106 of tub 104 for the addition of heat thereto and/or rejection of heat therefrom. A heat transfer fluid such as e.g., an aqueous solution, flowing within first heat exchanger 174 rejects heat to wash chamber 106 of tub 104 thereby heating its contents and/or receives heat from wash chamber 106 of tub 104 thereby cooling its contents. As an example, first heat exchanger 174 may be a conduit, such as copper or aluminum tubing, wound onto tub 104 at an outer surface 188 of tub 104. When first heat exchanger 174 is a conduit wound onto tub 104, first heat exchanger 174 may be brazed, soldered, clipped, adhered or otherwise suitably mounted to tub 104 at outer surface 188 of tub 104.

First heat exchanger 174 extends between a first inlet 184 and a second inlet 186. The heat transfer fluid from heat pump 176 may enter first heat exchanger 174 at first inlet 184 of first heat exchanger 174 and may exit first heat exchanger 174 at second inlet 186 of first heat exchanger 174 in a heating mode. Conversely, in a cooling mode, the heat transfer fluid from heat pump 176 may enter first heat exchanger 174 at second inlet 186 of first heat exchanger 174 and may exit first heat exchanger 174 at first inlet 184 of first heat exchanger 174. First inlet 184 of first heat exchanger 174 may be positioned at or proximate bottom portion 162 of tub 104, and second inlet 186 of first heat exchanger 174 may be positioned at or proximate top portion 160 of tub 104. Thus, first inlet 184 of first heat exchanger 174 may be positioned below second inlet 186 of first heat exchanger 174 along the vertical direction V on tub 104. In such a manner, the heat transfer fluid within first heat exchanger 174 may first heat bottom portion 162 of tub 104 before flowing upwardly along the vertical direction V to heat top portion 160 of tub 104 in the heating mode. Conversely, in the cooling mode, the heat transfer fluid within first heat exchanger 174 may first cool top portion 160 of tub 104 before flowing downwardly along the vertical direction V to cool bottom portion 162 of tub 104. In such a manner, efficient heat transfer between the heat transfer fluid within first heat exchanger 174 and wash chamber 106 of tub 104 may be facilitated. For example, liquid water at bottom portion 162 of tub 104 may be heated first in the heating mode, and water vapor or steam at top portion 164 of tub 104 may be cooled first in the cooling mode.

First heat exchanger 174 may be wound onto tub 104 between first and second inlets 184, 186 of first heat exchanger 174. As an example, first heat exchanger 174 may be wound onto tub 104 such that adjacent windings of first heat exchanger 174 are spaced apart from one another along the vertical direction V on outer surface 188 of tub 104, as shown in FIG. 3. In particular, adjacent windings of first heat exchanger 174 may be uniformly spaced apart from one another along the vertical direction V on outer surface 188 of tub 104. Thus, first heat exchanger 174 may be wound onto outer surface 188 of tub 104 at a constant rate. By uniformly spacing adjacent windings of first heat exchanger 174 on outer surface 188 of tub 104, uniform heat transfer between the heat transfer fluid within first heat exchanger 174 and wash chamber 106 of tub 104 along the vertical direction V may be facilitated.

Operation of heat pump system 170 in the heating mode will be described first. In the heating mode, the heat transfer fluid flows out of first heat exchanger 174 by line 190 to heat pump 176 after heating wash chamber 106 of tub 104. As will be further described herein, the heat transfer fluid rejects additional heat to magneto-caloric material (MCM) in heat pump 176 and then flows by line 192 to second heat exchanger 178, e.g., that is disposed within machinery compartment 140. The heat transfer fluid within second heat exchanger 178 is heated by the environment, machinery compartment 140, and/or another location external to wash chamber 106 of tub 104 via second heat exchanger 178. A fan 182 may be used to create a flow of air across second heat exchanger 178 and thereby improve the rate of heat transfer from the environment.

From second heat exchanger 178, the heat transfer fluid returns by line 194 to pump 172 and then to heat pump 176 where, as will be further described below, the heat transfer fluid receives heat from the MCM in heat pump 176. The now hotter heat transfer fluid flows by line 196 to first heat exchanger 174 to reject heat to wash chamber 106 of tub 104 and repeat the cycle as just described. Pump 172 connected into line 194 causes the heat transfer fluid to circulate in heat pump system 170. Motor 180 is in mechanical communication with heat pump 176 as will further described. During operation of heat pump system 170, the heat transfer fluid may not undergo a phase change.

Operation of heat pump system 170 in the cooling mode will now be described. In the cooling mode, the heat transfer fluid flows out of first heat exchanger 174 by line 196 to heat pump 176 after cooling wash chamber 106 of tub 104. As will be further described herein, the heat transfer fluid receives additional heat from the MCM in heat pump 176 and then flows by line 194 to pump 172 and then to second heat exchanger 178, e.g., that is disposed within machinery compartment 140. The heat transfer fluid within second heat exchanger 178 rejects heat to the environment, machinery compartment 140, and/or another location external to wash chamber 106 of tub 104 via second heat exchanger 178. Fan 182 may be used to create a flow of air across second heat exchanger 178 and thereby improve the rate of heat transfer from the environment.

From second heat exchanger 178, the heat transfer fluid returns by line 192 to heat pump 176 where, as will be further described below, the heat transfer fluid rejects heat to the MCM in heat pump 176. The now cooler heat transfer fluid flows by line 190 to first heat exchanger 174 to receive heat from wash chamber 106 of tub 104 and repeat the cycle as just described.

Heat pump system 170 is provided by way of example only. Other configurations of heat pump system 170 may be used as well. For example, lines 190, 192, 194 and 196 provide fluid communication between the various components of heat pump system 170 but other heat transfer fluid recirculation loops with different lines and connections may also be employed. For example, pump 172 can also be positioned at other locations or on other lines in heat pump system 170. Still other configurations of heat pump system 170 may be used as well. Heat pump 176 may be any suitable heat pump with MCM. For example, heat pump 176 may be constructed or arranged in the manner described in U.S. Patent Publication No. 2014/0165594 of Michael Alexander Benedict, which is hereby incorporated by reference in its entirety.

Dishwasher appliance 100 also includes a temperature sensor 164. Temperature sensor 164 is configured for measuring a temperature within wash chamber 106 of tub 104. Temperature sensor 164 can be positioned at any suitable location within dishwasher appliance 100. For example, temperature sensor 164 may be positioned within wash chamber 106 of tub 104 or may be mounted to tub 104 outside of wash chamber 106 of tub 104. When mounted to tub 104 outside of wash chamber 106 of tub 104, temperature sensor 164 can be configured for indirectly measuring the temperature of water within wash chamber 106 of tub 104. For example, temperature sensor 164 can measure the temperature of tub 104 and correlate the temperature of tub 104 to the temperature of wash chamber 106 of tub 104. Temperature sensor 164 can be any suitable temperature sensor. For example, temperature sensor 164 may be a thermocouple or a thermistor.

Dishwasher appliance 100 further includes a controller 116 that is configured for regulating operation of dishwasher appliance 100. Controller 116 is in, e.g., operative, communication with heating elements 166, pump 172, motor 180, fan 182 and temperature sensor 164. Thus, controller 116 can selectively activate heating element 166 and/or pump 172 and motor 180 in order to heat wash chamber 106 of tub 104.

Controller 116 includes (e.g., non-transitory) memory and one or more processing devices such as microprocessors, CPUs or the like, such as general or special purpose microprocessors operable to execute programming instructions or micro-control code associated with operation of dishwasher appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 116 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 116 may be positioned in a variety of locations throughout dishwasher appliance 100. In the illustrated embodiment, controller 116 may be located within a control panel area 110 of door 120 as shown. In such an embodiment, input/output ("I/O") signals may be routed between the control system and various operational components of dishwasher appliance 100 along wiring harnesses that may be routed through bottom 122 of door 120. Typically, the controller 116 includes a user interface panel 112 through which a user may select various operational features and modes and monitor progress of the dishwasher appliance 100. In one embodiment, user interface panel 112 may represent a general purpose I/O ("GPIO") device or functional block. In one embodiment, the user interface panel 112 may include input components, such as one or more of a variety of electrical, mechanical or electro-mechanical input devices including rotary dials, push buttons, and touch pads. User interface panel 112 may include a display component, such as a digital or analog display device designed to provide operational feedback to a user. User interface panel 112 may be in communication with controller 116 via one or more signal lines or shared communication busses. Controller 116 can operate heating element 166 and/or pump 172 and motor 180 in order to heat or cool wash chamber 106 of tub 104.

FIGS. 4 through 7 depict various views of an exemplary heat pump 200 of as may be used with the present subject matter. Thus, heat pump 200 may be utilized within dishwasher appliance 100 as heat pump 176. Heat pump 200 is provided by way of example only and is not intended to limit the present subject matter to any particular heat pump. As will be understood, any other suitable heat pump, such as a linearly actuating heat pump, may be utilized within dishwasher appliance 100 as heat pump 176 in alternative exemplary embodiments.

Figure 4:
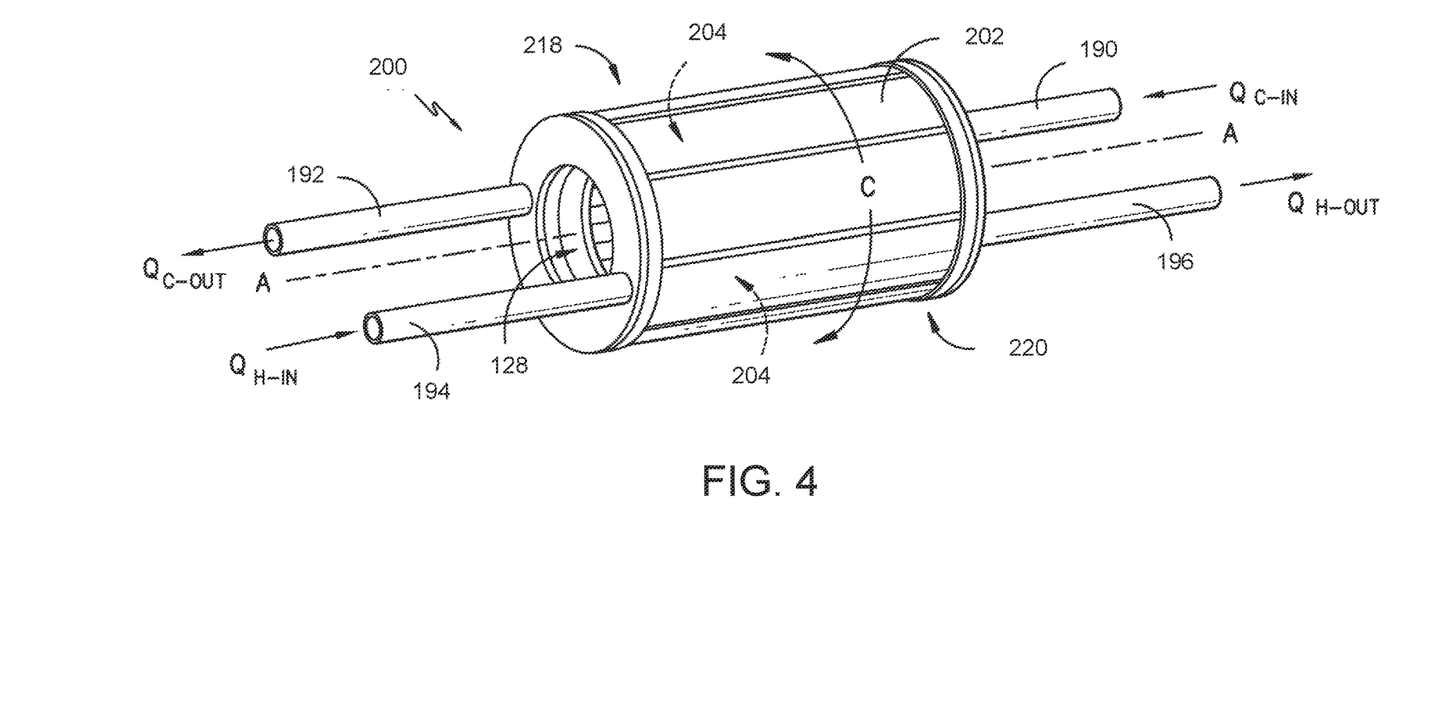
FIG. 4 provides a perspective view of a heat pump according to an exemplary embodiment of the present subject matter.
Figure 6:
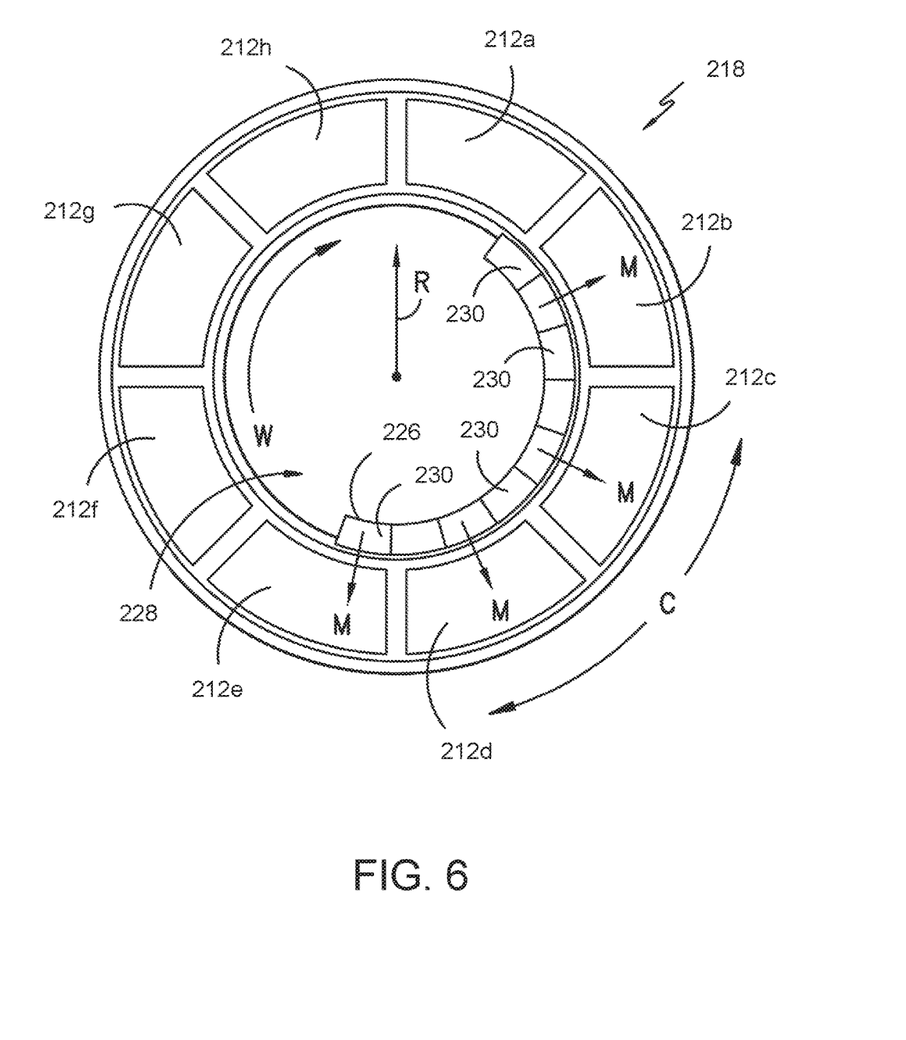
FIG. 6 provides a section view of the exemplary heat pump of FIG. 4.

Heat pump 200 includes a regenerator housing 202 that extends longitudinally along an axial direction between a first end 218 and a second end 220. The axial direction is defined by axis A-A about which regenerator housing 202 is rotatable. A radial direction R is defined by a radius extending orthogonally from the axis of rotation A-A (FIG. 6). A circumferential direction is indicated by arrows C.

Figure 5:
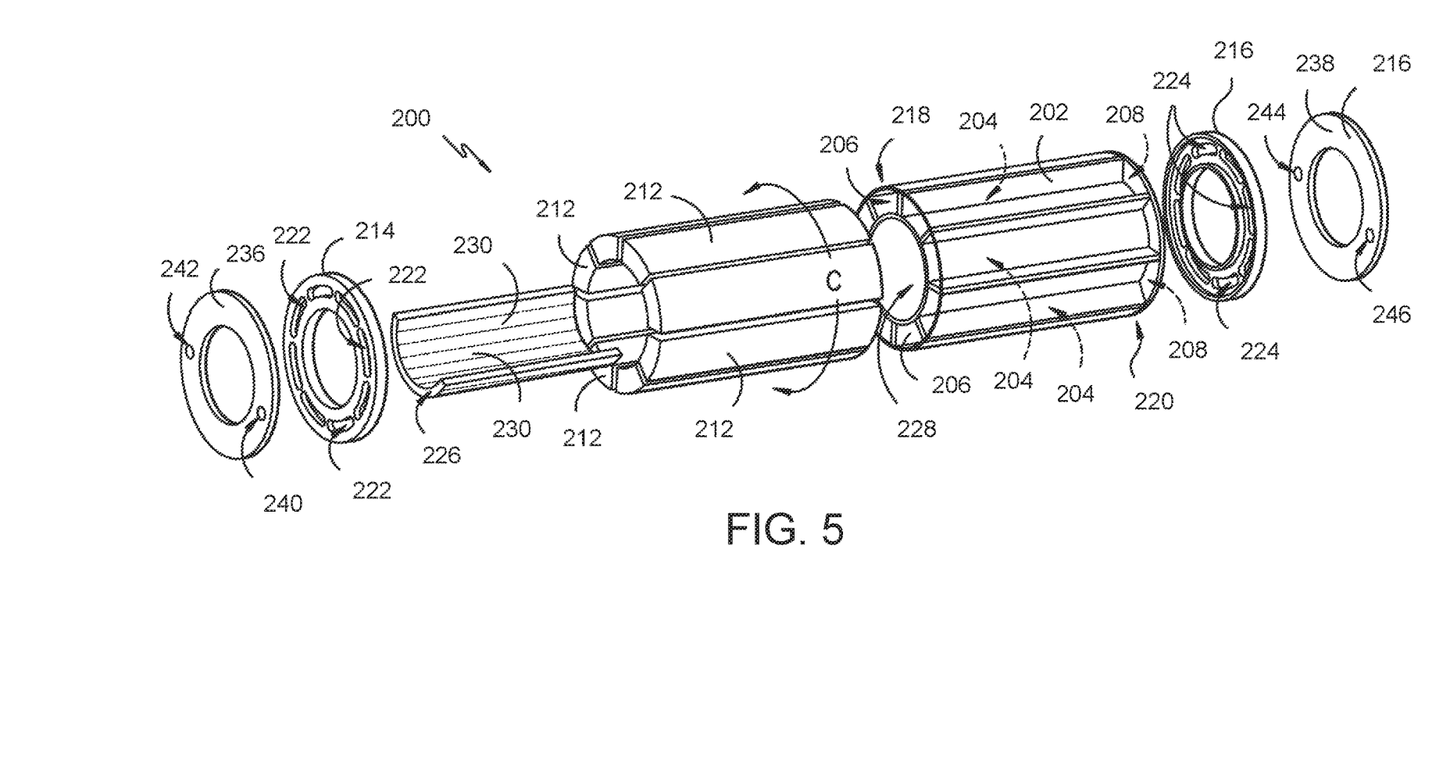
FIG. 5 provides an exploded view of the exemplary heat pump of FIG. 4.

Regenerator housing 202 defines a plurality of chambers 204 that extend longitudinally along the axial direction defined by axis A-A. Chambers 204 are positioned proximate or adjacent to each other along circumferential direction C. Each chamber 204 includes a pair of openings 206 and 208 positioned at opposing ends 218 and 220 of regenerator housing 202.

Heat pump 200 also includes a plurality of stages 212 that include MCM. Each stage 212 is located in one of the chambers 204 and extends along the axial direction. For the exemplary embodiment shown in the figures, heat pump 200 includes eight stages 212 positioned adjacent to each other along the circumferential direction as shown and extending longitudinally along the axial direction. As will be understood by one of skill in the art using the teachings disclosed herein, a different number of stages 212 other than eight may be used as well.

A pair of valves 214 and 216 is attached to regenerator housing 202 and rotates therewith along circumferential direction C. More particularly, a first valve 214 is attached to first end 218 and a second valve 216 is attached to second end 220. Each valve 214 and 216 includes a plurality of apertures 222 and 224, respectively. For this exemplary embodiment, apertures 222 and 224 are configured as circumferentially-extending slots that are spaced apart along circumferential direction C. Each aperture 222 is positioned adjacent to a respective opening 206 of a chamber 204. Each aperture 224 is positioned adjacent to a respective opening 208 of a chamber 204. Accordingly, a heat transfer fluid may flow into a chamber 204 through a respective aperture 222 and opening 206 so as to flow through the MCM in a respective stage 212 and then exit through opening 208 and aperture 224. A reverse path can be used for flow of the heat transfer fluid in the opposite direction through the stage 212 of a given chamber 204.

Regenerator housing 202 defines a cavity 228 that is positioned radially inward of the plurality of chambers 204 and extends along the axial direction between first end 218 and second end 220. A magnetic element 226 is positioned within cavity 228 and, for this exemplary embodiment, extends along the axial direction between first end 218 and second end 220. Magnetic element 226 provides a magnetic field that is directed radially outward as indicated by arrows M in FIG. 6.

The positioning and configuration of magnetic element 226 is such that only a subset of the plurality of stages 212 is within magnetic field M at any one time. For example, as shown in FIG. 6, stages 212a and 212e are partially within the magnetic field while stages 212b, 212c, and 212d are fully within the magnetic field M created by magnetic element 226. Conversely, the magnetic element 226 is configured and positioned so that stages 212f, 212g, and 212h are completely or substantially out of the magnetic field created by magnetic element 226. However, as regenerator housing 202 is continuously rotated along the circumferential direction as shown by arrow W, the subset of stages 212 within the magnetic field will continuously change as some stages 212 will enter magnetic field M and others will exit.

A pair of seals 236 and 238 is provided with the seals positioned in an opposing manner at the first end 218 and second end 220 of regenerator housing 202. First seal 236 has a first inlet port 240 and a first outlet port 242 and is positioned adjacent to first valve 214. As shown, ports 240 and 242 are positioned 180 degrees apart about the circumferential direction C of first seal 214. However, other configurations may be used. For example, ports 240 and 242 may be positioned within a range of about 170 degrees to about 190 degrees about the circumferential direction C as well. First valve 214 and regenerator housing 202 are rotatable relative to first seal 236. Ports 240 and 242 are connected with lines 190 and 192 (FIG. 3), respectively. As such, the rotation of regenerator housing 202 about axis A-A sequentially places lines 190 and 192 in fluid communication with at least two stages 212 of MCM at any one time as will be further described.

Second seal 238 has a second inlet port 244 and a second outlet port 246 and is positioned adjacent to second valve 216. As shown, ports 244 and 246 are positioned 180 degrees apart about the circumferential direction C of second seal 216. However, other configurations may be used. For example, ports 244 and 246 may be positioned within a range of about 170 degrees to about 190 degrees about the circumferential direction C as well. Second valve 216 and regenerator housing 202 are rotatable relative to second seal 238. Ports 244 and 246 are connected with lines 196 and 194 (FIG. 3), respectively. As such, the rotation of regenerator housing 202 about axis A-A sequentially places lines 194 and 196 in fluid communication with at least two stages 212 of MCM at any one time as will be further described. Notably, at any one time during rotation of regenerator housing 202, lines 192 and 196 will each be in fluid communication with at least one stage 212 while lines 190 and 194 will also be in fluid communication with at least one other stage 212 located about 180 degrees away along the circumferential direction.

Figure 7:
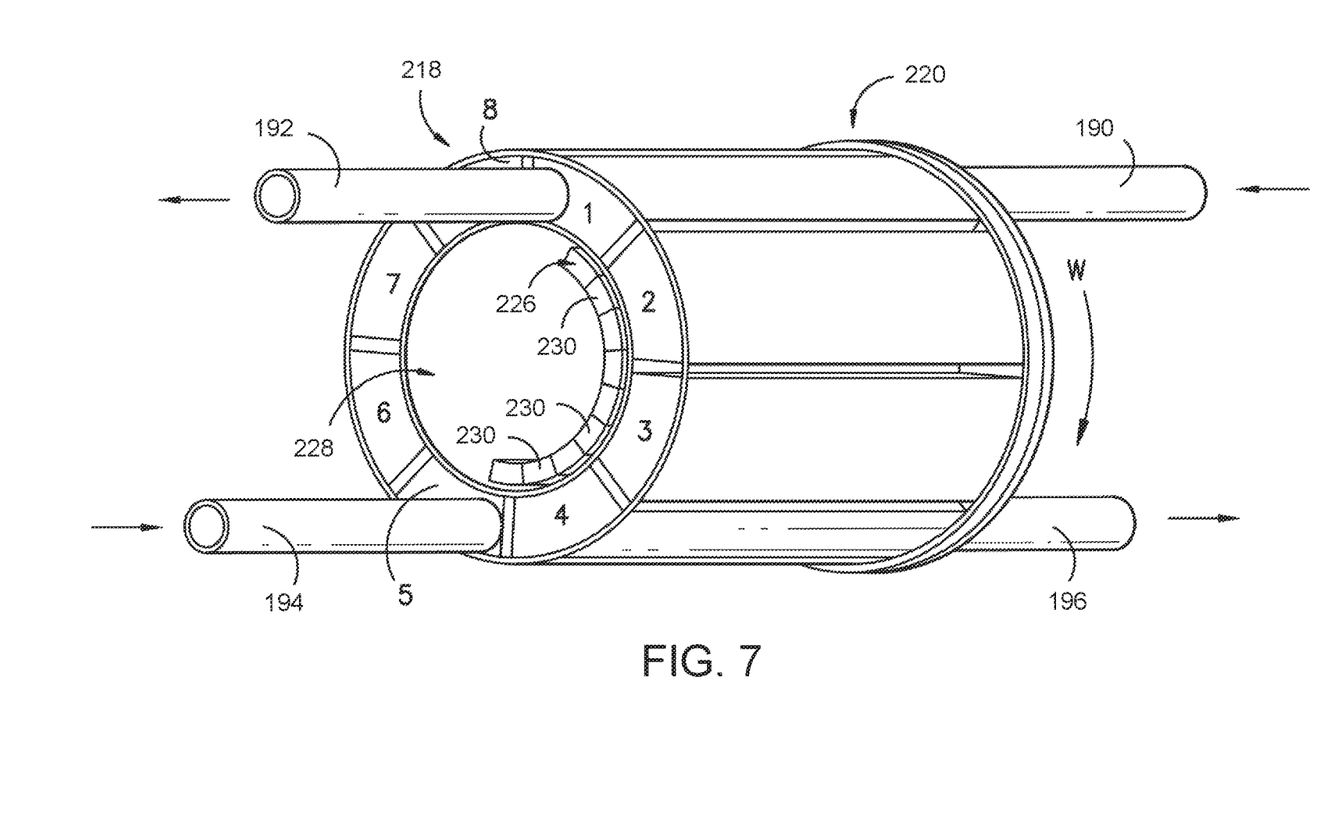
FIG. 7 provides perspective view of the exemplary heat pump of FIG. 4.
Figure 8:
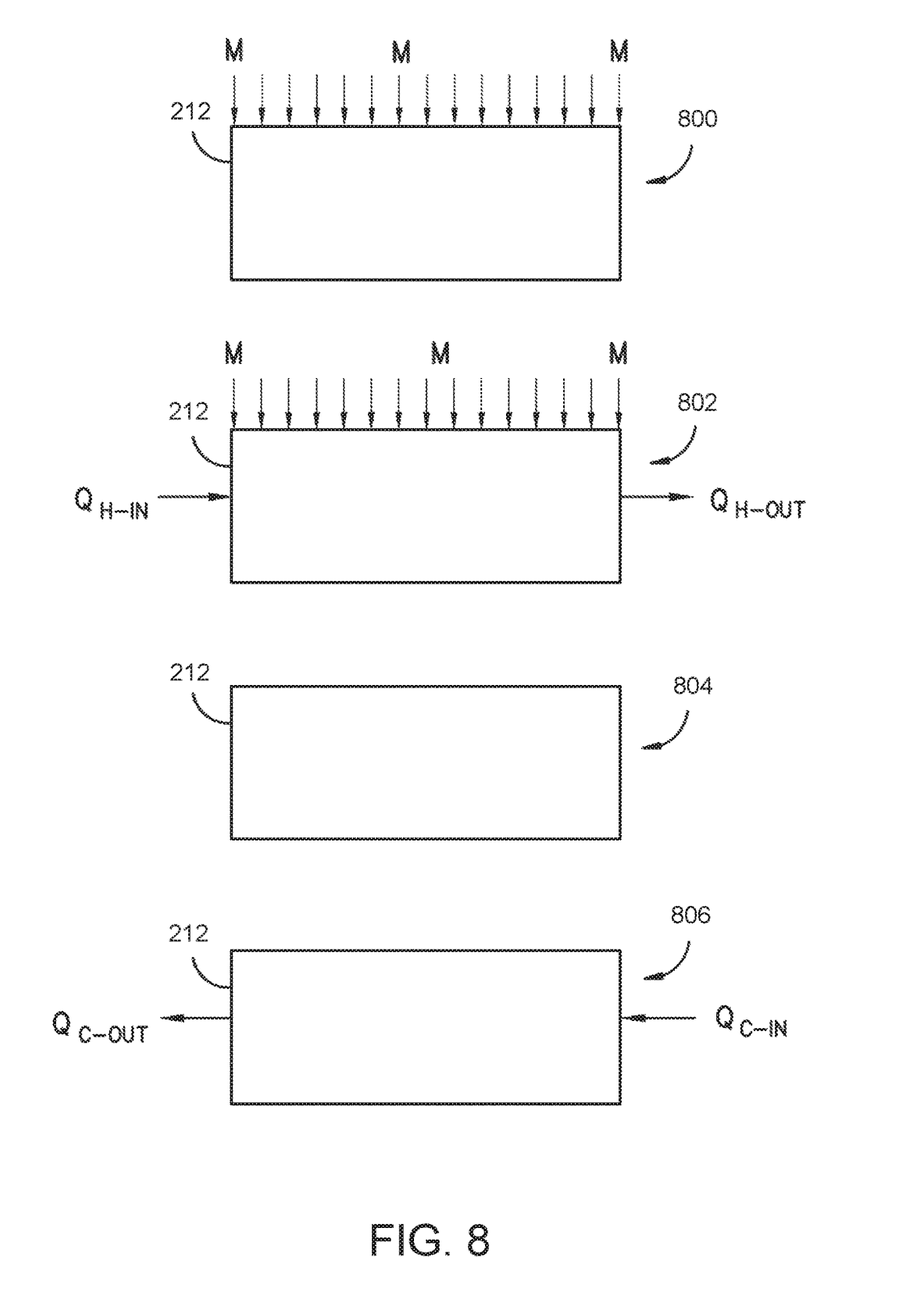
FIG. 8 provides a schematic representation of various steps in the use of a stage of the exemplary heat pump of FIG. 4.

FIG. 8 illustrates an exemplary method using a schematic representation of stage 212 of MCM in regenerator housing 202 as it rotates in the direction of arrow W between positions 1 through 8 as shown in FIG. 7. As will be understood, other suitable arrangements of heat pump 176 (e.g., linear motion of stages 212 of MCM) may be utilized to provide similar heating and cooling of the heat transfer fluid, e.g., via the magneto-caloric effect in stages 212 of MCM. During step 800, stage 212 is fully within magnetic field M, which causes the magnetic moments of the material to orient and the MCM to heat as part of the magneto-caloric effect. Ordering of the magnetic field is created and maintained as stage 212 is rotated sequentially through positions 2, 3, and then 4 (FIG. 7) as regenerator housing 202 is rotated in the direction of arrow W. During the time at positions 2, 3, and 4, the heat transfer fluid dwells in the MCM of stage 212 and, therefore, is heated. More specifically, the heat transfer fluid does not flow through stage 212 because the openings 206, 208, 222, and 224 corresponding to stage 212 in positions 2, 3, and 4 are not aligned with any of the ports 240, 242, 244, or 246.

In step 802, as regenerator housing 202 continues to rotate in the direction of arrow W, stage 212 will eventually reach position 5. As shown in FIGS. 4 and 7, at position 5 the heat transfer fluid can flow through the material as first inlet port 240 is now aligned with an opening 222 in first valve 214 and an opening 206 at the first end 218 of stage 212 while second outlet port 246 is aligned with an opening 224 in second valve 216 at the second end 220 of stage 212. As indicated by arrow $Q_{H-OUT}$, heat transfer fluid in stage 212, now heated by the MCM, can travel out of regenerator housing 202 and along line 196 to the first heat exchanger 174. At the same time, and as indicated by arrow $Q_{H-IN}$, heat transfer fluid from second heat exchanger 178 flows into stage 212 from line 192 when stage 212 is at position 5. Because heat transfer fluid from the second heat exchanger 178 is relatively cooler than the MCM in stage 212, the MCM rejects heat to the heat transfer fluid.

Referring again to FIG. 8 and step 804, as regenerator housing 202 continues to rotate in the direction of arrow W, stage 212 is moved sequentially through positions 6, 7, and 8 where stage 212 is completely or substantially out of magnetic field M. The absence or lessening of the magnetic field is such that the magnetic moments of the material become disordered and the MCM absorbs heat as part of the magneto-caloric effect. During the time in positions 6, 7, and 8, the heat transfer fluid dwells in the MCM of stage 212 and, therefore, is cooled by losing heat to the MCM as the magnetic moments disorder. More specifically, the heat transfer fluid does not flow through stage 212 because the openings 206, 208, 222, and 224 corresponding to stage 212 when in positions 6, 7, and 8 are not aligned with any of the ports 240, 242, 244, or 246.

Referring to step 806 of FIG. 8, as regenerator housing 202 continues to rotate in the direction of arrow W, stage 212 will eventually reach position 1. As shown in FIGS. 4 and 7, at position 1 the heat transfer fluid in stage 212 can flow through the material as second inlet port 244 is now aligned with an opening 224 in second valve 216 and an opening 208 at the second end 220 while first outlet port 242 is aligned with an opening 222 in first valve 214 and opening 206 at first end 218. As indicated by arrow $Q_{C-OUT}$, heat transfer fluid in stage 212, now cooled by the MCM, can travel out of regenerator housing 202 and along line 192 to the second heat exchanger 178. At the same time, and as indicated by arrow $Q_{C-IN}$, heat transfer fluid from first heat exchanger 174 flows into stage 212 from line 190 when stage 212 is at position 5. Because heat transfer fluid from the first heat exchanger 174 is relatively warmer than the MCM in stage 212 at position 5, the MCM will be heated by the heat transfer fluid. The heat transfer fluid now travels along line 192 to the second heat exchanger 178 to receive additional heat.

As regenerator housing 202 is rotated continuously, the above described process of placing stage 212 in and out of magnetic field M is repeated. Additionally, the size of magnetic field M and regenerator housing 202 are such that a subset of the plurality of stages 212 is within the magnetic field at any given time during rotation. Similarly, a subset of the plurality of stages 212 are outside (or substantially outside) of the magnetic field at any given time during rotation. Additionally, at any given time, there are at least two stages 212 through which the heat transfer fluid is flowing while the other stages remain in a dwell mode. More specifically, while one stage 212 is losing heat through the flow of heat transfer fluid at position 5, another stage 212 is receiving heat from the flowing heat transfer fluid at position 1, while all remaining stages 212 are in dwell mode. As such, the system can be operated continuously to provide a continuous recirculation of heat transfer fluid in heat pump system 170 as stages 212 are each sequentially rotated through positions 1 through 8.

Utilizing the exemplary method of FIG. 8, wash chamber 106 of tub 104 may be heated by heat transfer fluid within first heat exchanger 174. Such heating of wash chamber 106 of tub 104 may assist with drying articles within wash chamber 106 of tub 104, heating water within wash chamber 106 of tub 104, etc. As discussed in greater detail below, wash chamber 106 of tub 104 may also be cooled by heat transfer fluid within first heat exchanger 174. Such cooling of wash chamber 106 of tub 104 may assist with condensation moisture on tub 104.

Figure 9:
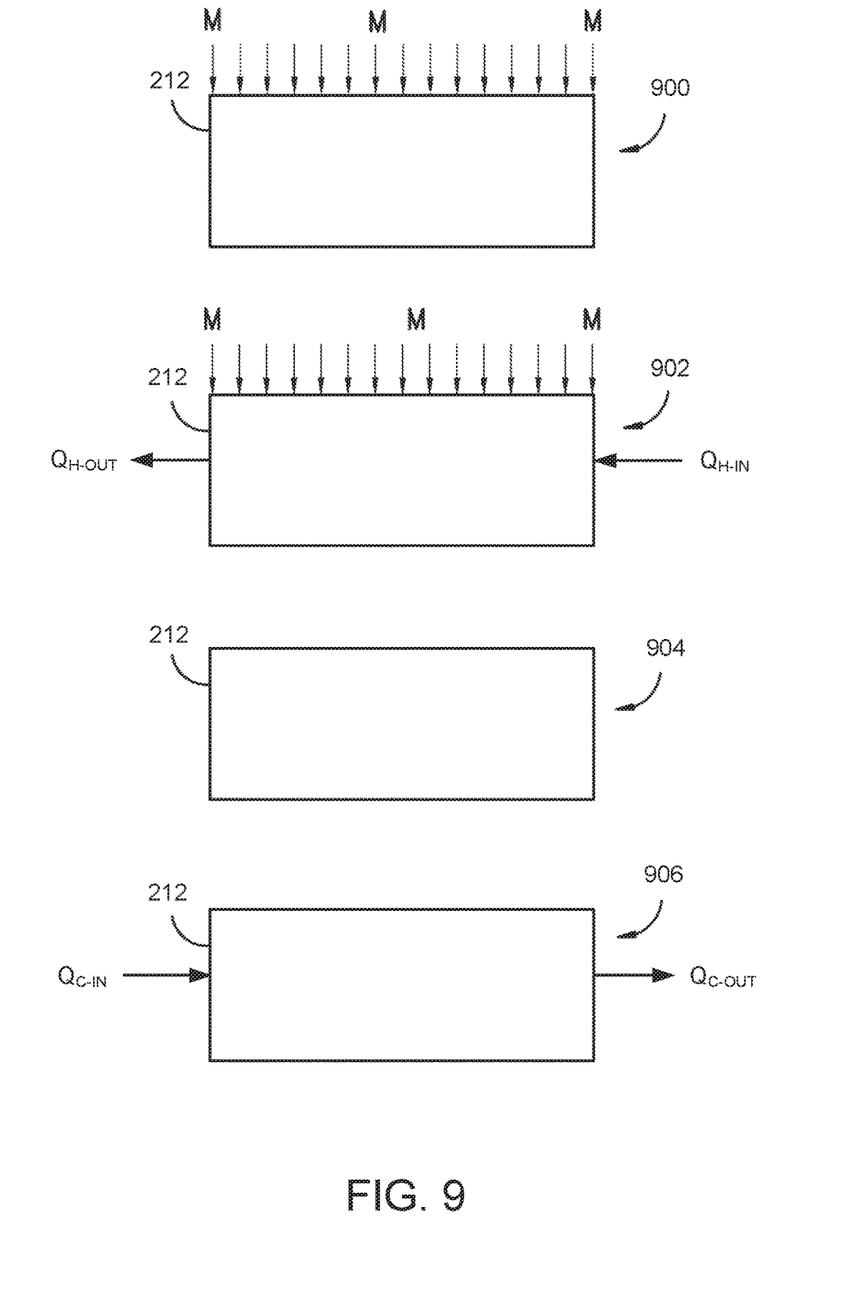
FIG. 9 provides another schematic representation of various steps in the use of a stage of the exemplary heat pump of FIG. 4.

FIG. 9 illustrates an exemplary method using a schematic representation of stage 212 of MCM in regenerator housing 202 as it rotates in the direction of arrow W between positions 1 through 8 as shown in FIG. 7. To adjust between the operations of heat pump 200 shown in FIGS. 8 and 9, pump 172 may be reversed or a valve within heat pump system 170 may actuated to reverse the direction of heat transfer fluid flow within heat pump system 170. Thus, pump 172 may be a reversible pump in certain exemplary embodiments. In alternative exemplary embodiments, heat pump system 170 may include a valve(s) for reversing fluid flow through heat pump system 170, e.g., rather than reversing the direction of pump 172. Thus, heat pump system 170 may be adjusted between the heating and cooling operations by reversing pump 172 or actuating suitable valve(s).

During step 900, stage 212 is fully within magnetic field M, which causes the magnetic moments of the material to orient and the MCM to heat as part of the magneto-caloric effect. Ordering of the magnetic field is created and maintained as stage 212 is rotated sequentially through positions 2, 3, and then 4 (FIG. 7) as regenerator housing 202 is rotated in the direction of arrow W. During the time at positions 2, 3, and 4, the heat transfer fluid dwells in the MCM of stage 212 and, therefore, is heated. More specifically, the heat transfer fluid does not flow through stage 212 because the openings 206, 208, 222, and 224 corresponding to stage 212 in positions 2, 3, and 4 are not aligned with any of the ports 240, 242, 244, or 246.

In step 902, as regenerator housing 202 continues to rotate in the direction of arrow W, stage 212 will eventually reach position 5. As shown in FIGS. 4 and 7, at position 5 the heat transfer fluid can flow through the material as first inlet port 240 is now aligned with an opening 222 in first valve 214 and an opening 206 at the first end 218 of stage 212 while second outlet port 246 is aligned with an opening 224 in second valve 216 at the second end 220 of stage 212. Heat transfer fluid in stage 212, now heated by the MCM, can travel out of regenerator housing 202 and along line 194 to pump 172 and then to second heat exchanger 178. At the same time, heat transfer fluid from first heat exchanger 174 flows into stage 212 from line 196 when stage 212 is at position 5. Because heat transfer fluid from the first heat exchanger 174 is relatively cooler than the MCM in stage 212, the MCM rejects heat to the heat transfer fluid.

Referring again to FIG. 9 and step 904, as regenerator housing 202 continues to rotate in the direction of arrow W, stage 212 is moved sequentially through positions 6, 7, and 8 where stage 212 is completely or substantially out of magnetic field M. The absence or lessening of the magnetic field is such that the magnetic moments of the material become disordered and the MCM absorbs heat as part of the magneto-caloric effect. During the time in positions 6, 7, and 8, the heat transfer fluid dwells in the MCM of stage 212 and, therefore, is cooled by losing heat to the MCM as the magnetic moments disorder. More specifically, the heat transfer fluid does not flow through stage 212 because the openings 206, 208, 222, and 224 corresponding to stage 212 when in positions 6, 7, and 8 are not aligned with any of the ports 240, 242, 244, or 246.

Referring to step 906 of FIG. 9, as regenerator housing 202 continues to rotate in the direction of arrow W, stage 212 will eventually reach position 1. As shown in FIGS. 4 and 7, at position 1 the heat transfer fluid in stage 212 can flow through the material as second inlet port 244 is now aligned with an opening 224 in second valve 216 and an opening 208 at the second end 220 while first outlet port 242 is aligned with an opening 222 in first valve 214 and opening 206 at first end 218. Heat transfer fluid in stage 212, now cooled by the MCM, can travel out of regenerator housing 202 and along line 190 to the first heat exchanger 174. At the same time, heat transfer fluid from second heat exchanger 178 flows into stage 212 from line 192 when stage 212 is at position 5. Because heat transfer fluid from the second heat exchanger 178 is relatively warmer than the MCM in stage 212 at position 5, the MCM will be heated by the heat transfer fluid.

As will be understood by one of skill in the art using the teachings disclosed herein, the number of stages for housing 202, the number of ports in valve 214 and 216, and/or other parameters can be varied to provide different configurations of heat pump 200 while still providing for continuous operation. For example, each valve could be provided within two inlet ports and two outlet ports so that heat transfer fluid flows through at least four stages 212 at any particular point in time. Alternatively, regenerator housing 202, valves 222 and 224, and/or seals 236 and 238 could be constructed so that e.g., at least two stages are in fluid communication with an inlet port and outlet port at any one time. Other configurations may be used as well.

As stated, stage 212 includes MCM extending along the axial direction of flow. The MCM may be constructed from a single magneto caloric material or may include multiple different magneto caloric materials. By way of example, dishwasher appliance 100 may be used in an application where the ambient temperature changes over a substantial range. However, a specific magneto caloric material may exhibit the magneto caloric effect over only a much narrower temperature range. As such, it may be desirable to use a variety of magneto caloric materials within a given stage to accommodate the wide range of ambient temperatures over which dishwasher appliance 100 and/or heat pump 200 may be used.

A motor 180 is in mechanical communication with regenerator housing 202 and provides for rotation of housing 202 about axis A-A. By way of example, motor 180 may be connected directly with housing 202 by a shaft or indirectly through a gear box. Other configurations may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwasher appliance, comprising:
 a tub defining a wash chamber, the tub extending between a top portion and a bottom portion along a vertical direction;
 a first heat exchanger coupled to the tub for delivery of heat to and from the wash chamber of the tub, the first heat exchanger extending between a first inlet and a second inlet, the first inlet of the first heat exchanger positioned at the bottom portion of the tub, the second inlet of the first heat exchanger positioned at the top portion of the tub;
 a second heat exchanger; and
 a caloric heat pump system configured for heating and cooling the wash chamber of the tub at the first heat exchanger, the caloric heat pump system comprising
 a plurality of caloric material stages;
 a field generator positioned proximate the caloric material stages, the field generator positioned such that the caloric material stages are moved in and out of a field of the field generator during operation of the caloric heat pump system; and a pump for circulating a heat transfer fluid between the first and second heat exchangers and the caloric material stages, wherein the pump is operable to flow the heat transfer fluid into the first heat exchanger at the first inlet of the first heat exchanger and out of the first heat exchanger at the second inlet of the first heat exchanger in a heating mode, and the pump is operable to flow the heat transfer fluid into the first heat exchanger at the second inlet of the first heat exchanger and out of the first heat exchanger at the first inlet of the first heat exchanger in a cooling mode.

2. The dishwasher appliance of claim 1, wherein the tub includes a sump portion at a bottom of the tub, the first heat exchanger coupled to the tub at the sump of the tub.

3. The dishwasher appliance of claim 1, wherein the heat transfer fluid comprises water.

4. The dishwasher appliance of claim 1, further comprising an electric heating element disposed within the tub and operable to heat the wash chamber of the tub.

5. The dishwasher appliance of claim 1, wherein the second heat exchanger, the caloric material stages and the pump all disposed within a machinery compartment below the tub.

6. The dishwasher appliance of claim 1, wherein the first heat exchanger comprises a conduit mounted to the tub at an outer surface of the tub.

7. The dishwasher appliance of claim 6, wherein the conduit of the first heat exchanger is wound onto the tub between the first and second inlets of the first heat exchanger.

8. The dishwasher appliance of claim 7, wherein adjacent windings of the conduit are spaced apart from one another along the vertical direction on the outer surface of the tub.

9. The dishwasher appliance of claim 8, wherein the adjacent windings of the conduit are uniformly spaced apart from one another along the vertical direction on the outer surface of the tub.

10. The dishwasher appliance of claim 8, the first inlet of the conduit is positioned at the bottom portion of the tub and the second inlet of the conduit is positioned at the top portion of the tub, the first inlet of the conduit being in fluid communication with at least one of the caloric material stages such that the first inlet of the conduit is configured to receive circulating heat transfer fluid from the at least one of the caloric material stages in the heating mode.

11. A dishwasher appliance, comprising:
a tub defining a wash chamber, the tub extending between a top portion and a bottom portion along a vertical direction;
a first heat exchanger coupled to the tub for delivery of heat to and from the wash chamber of the tub, the first heat exchanger extending between a first inlet and a second inlet, the first inlet of the first heat exchanger positioned at the bottom portion of the tub, the second inlet of the first heat exchanger positioned at the top portion of the tub;

a second heat exchanger disposed within a machinery compartment below the tub such that the second heat exchanger is spaced apart from the first heat exchanger;

a caloric heat pump system configured for heating and cooling the wash chamber of the tub via the first heat exchanger, the caloric heat pump system comprising
a plurality of caloric material stages disposed within the machinery compartment below the tub;
a field generator positioned proximate the caloric material stages, the field generator positioned such that the caloric material stages are moved in and out of a field of the field generator during operation of the caloric heat pump system; and
a pump disposed within the machinery compartment below the tub, the pump configured for circulating an aqueous heat transfer fluid between the first and second heat exchangers and the caloric material stages, wherein the pump is operable to flow the heat transfer fluid into the first heat exchanger at the first inlet of the first heat exchanger and out of the first heat exchanger at the second inlet of the first heat exchanger in a heating mode, and the pump is operable to flow the heat transfer fluid into the first heat exchanger at the second inlet of the first heat exchanger and out of the first heat exchanger at the first inlet of the first heat exchanger in a cooling mode.

12. The dishwasher appliance of claim 11, wherein the tub includes a sump portion at a bottom of the tub, the first heat exchanger coupled to the tub at the sump of the tub.

13. The dishwasher appliance of claim 11, wherein the first heat exchanger comprises a conduit mounted to the tub at an outer surface of the tub.

14. The dishwasher appliance of claim 13, wherein the conduit of the first heat exchanger is wound onto the tub between the first and second inlets of the first heat exchanger.

15. The dishwasher appliance of claim 14, wherein adjacent windings of the conduit are spaced apart from one another along the vertical direction on the outer surface of the tub.

16. The dishwasher appliance of claim 15, wherein the adjacent windings of the conduit are uniformly spaced apart from one another along the vertical direction on the outer surface of the tub.

17. The dishwasher appliance of claim 15, the first inlet of the conduit is positioned at the bottom portion of the tub and the second inlet of the conduit is positioned at the top portion of the tub, the first inlet of the conduit being in fluid communication with at least one of the caloric material stages such that the first inlet of the conduit is configured to receive circulating heat transfer fluid from the at least one of the caloric material stages in the heating mode.

18. The dishwasher appliance of claim 11, further comprising an electric heating element disposed within the tub and operable to heat the wash chamber of the tub.

\* \* \* \* \*